(12) United States Patent
Nishimura et al.

(10) Patent No.: US 6,778,958 B1
(45) Date of Patent: Aug. 17, 2004

(54) SYMBOL INSERTION APPARATUS AND METHOD

(75) Inventors: Masafumi Nishimura, Yokohama (JP); Nobuyasu Itoh, Yokohama (JP); Shinsuke Mori, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 192 days.

(21) Appl. No.: 09/651,679

(22) Filed: Aug. 30, 2000

(30) Foreign Application Priority Data

Aug. 30, 1999 (JP) .......................................... 11-243311

(51) Int. Cl.[7] .......................... G10L 15/14; G10L 15/26
(52) U.S. Cl. ........................ 704/235; 704/244; 704/255
(58) Field of Search ................................ 704/235, 240, 704/251, 243, 244, 255, 256, 257

(56) References Cited

U.S. PATENT DOCUMENTS

| | | | | |
|---|---|---|---|---|
| 4,914,704 A | * | 4/1990 | Cole et al. .................. | 704/235 |
| 5,027,406 A | * | 6/1991 | Roberts et al. ............. | 704/244 |
| 6,067,514 A | * | 5/2000 | Chen .......................... | 704/235 |
| 6,718,303 B2 | * | 4/2004 | Tang et al. ................. | 704/235 |
| 2002/0069055 A1 | * | 6/2002 | Tang et al. ................. | 704/235 |

OTHER PUBLICATIONS

Beeferman et al., "Cyberpunc: a lightweight punctuation annotation system for speech," ICASSP '98. Proceedings of the 1998 IEEE International Conference on Acoustics, Speech, and Signal Processing, May 12–15, 1988, vol. 2, pp. 689 to 692.*

N. Klarlund, "Editing by voice and the role of sequential symbol systems for improved human–to–computer information rates," 2003 IEEE International Conference on Acoustics, Speech, and Signal Processing, Apr. 6–10, 2003, vol. 5, pp. 728–731.*

* cited by examiner

*Primary Examiner*—Richemond Dorvil
*Assistant Examiner*—Martin Lerner
(74) *Attorney, Agent, or Firm*—Ference & Associates (57) ABSTRACT

An apparatus and method are provided for the insertion of punctuation marks into appropriate positions in a sentence. An acoustic processor processes input utterances to extract voice data, and transforms the data into a feature vector. When the automatic insertion of punctuation marks is not performed, a language decoder processes the feature vector using only a general-purpose language model, and inserts a comma at a location marked in the voice data by the entry "ten," for example, which is clearly a location at which a comma should be inserted. When automatic punctuation insertion is performed, the language decoder employs the general-purpose language model and the punctuation mark language model to identify an unvoiced, pause location for the insertion of a punctuation mark, such as a comma.

16 Claims, 5 Drawing Sheets

When punctuation mark language model is off
- ..... koroga (pause) (ten) honhatsumeino (pause) yohten
- ".... koro – ga, honhatsumei – no yohten"

[B]

When punctuation mark language model is on
- ..., koroga (pause) honhatsumeino (pause) yohten
  "kore" "ga" ⌐","¬ "hon" "hatsumei" "no" ⌐","¬ "yohten"
              └ NULL ┘                    └ NULL ┘

- "..., kore – ga, honhatsumei – no yohten"

SYMBOL INSERTION APPARATUS AND METHOD

CLAIMS FOR PRIORITY

This application claims priority from Japanese Application No. 11-243311, filed on Aug. 30, 1999, which is hereby incorporated by reference as if fully set forth herein.

FIELD OF THE INVENTION

The present invention generally relates to a speech recognition apparatus and method for recognizing an utterance and transforming it into sentences, and in particular, for automatically inserting a "," or a "." when preparing text data.

BACKGROUND OF THE INVENTION

The method by which to perform a statistical process to automatically insert punctuation marks when performing a speech recognition procedure is well known. A method for automatically inserting a "," or a "." into text data obtained through speech recognition is disclosed in, for example, "Word-based Approach To Large-vocabulary Continuous Speech Recognition For Japanese," Nishimura, et al., Information Processing Institute Thesis, Vol. 40, No. 4, Apr. 1999, and Japanese Unexamined Patent Publications No. Hei 10-301930 and No. Hei 7-191690. In addition, the estimation of the N-gram model used for speech recognition is disclosed on page 15 of IBM Via Voice, Practice Edition (issued by Info Creates Publishing Department on Sep. 30, 1998).

But for this method, a language model for the prediction of punctuation marks, and a special pronunciation dictionary must be prepared as part of a recognition task. Specifically, according to this method, in order for punctuation marks to be automatically inserted, a large memory area of several tens of MB (e.g., 60 MB or greater) must be prepared for the automatic punctuation insertion processing, in addition to the memory area that is required for other, unrelated tasks.

Furthermore, while for a common speech recognition apparatus (a dictation system) it is assumed that a user will be able to select a punctuation insertion function as needed, in actuality, to make such a selection a user must restart a program, and thus, an extended period of time is required to switch to this function.

A need has thus been recognized in connection with improving upon the deficiencies presented by the current practices.

SUMMARY OF THE INVENTION

The present invention broadly contemplates a speech recognition apparatus and a method therefor, and in particular, for employing both a general-purpose vocabulary/language model and a specialized vocabulary/language model to insert a symbol such as a "," or a "." at an appropriate location in a sentence.

In accordance with one aspect of the invention, a speech recognition apparatus is provided which comprises: a transformer for transforming sequences of phonemes extracted from an utterance into one or more word sequences, and for assigning to the word sequences appearance probabilities, in accordance with which the word sequences are originally represented by the phoneme sequences; a renewer for renewing the appearance probability assigned to each of the word sequences by employing a renewal value represented by a language model corresponding to each of the word sequences; and a speech recognizer for selecting the word sequence having the highest appearance probability, by screening all the word sequences assigned appearance probabilities, according to which the word sequences are originally represented by the phoneme sequences, wherein the renewer calculates the renewal value using a first language model which is employed when each of the word sequences always includes a specific symbol as a word and a second language model which is employed in other situations to renew the appearance probabilities based on the renewal value.

In another aspect of the invention, the first language model is demonstratively reliable, in that when each of the word sequences includes a specific symbol, such as a word, each of the word sequences was originally represented by one of the phoneme sequences, and the second language model is also demonstratively reliable, in that when other situations are encountered, each of the word sequences was originally represented by one of the phoneme sequences. Further, the renewer calculates the renewal value based on the first and the second language models, and employs the renewal value to renew the appearance probability assigned to each of the sequences, so as to reflect the reliability demonstrated by the word sequences having been represented originally by the phoneme sequences.

In another aspect of the invention, the first language model which is demonstratively reliable in that when each of the word sequences includes a specific symbol, analogous to a word, each of the word sequences includes one or more words in the order for each of the word sequences. The second language model is demonstratively reliable in that in other situations the pertinent word sequence includes one or more words arranged in the same order as that of each of the word sequences. The renewer calculates the renewal value based on the first and the second language models, and employs the renewal value to renew the appearance probability assigned to each of the sequences, so as to demonstrate the reliability for each of the word sequences that was originally represented by the phoneme sequences.

In another aspect of the invention, in order to include the symbol in the speech recognition results that are obtained, the phoneme sequence/word sequence transformer transforms the phoneme sequences into one or more word sequences, or in the other situation, transforms the phoneme sequences into one or more word sequences each of which includes words other than the symbol, and provides the appearance probability. In order to include the symbol in the results obtained by the speech recognition process, the renewer employs the first and the second language models to renew the appearance probability assigned to each of the word sequences, or in the other situation, employs only the second language model to renew the appearance probability.

In another aspect of the invention, the first and the second language models are N-gram models, and the renewer employs, as the renewal value, a weighted average calculated for the first and the second language models.

In another aspect of the invention, the symbol is a comma or a period under and subject to a speech recognition method.

In accordance with another aspect of the invention, a speech recognition method is provided which comprises: a transformation step of transforming sequences of phonemes extracted from an utterance into one or more word sequences, and of assigning to the word sequences appearance probabilities, in accordance with which the word sequences are originally represented by the phoneme sequences; a renewing step of renewing the appearance probability assigned to each of the word sequences by employing a renewal value represented by a language model corresponding to each of the word sequences; and a speech recognition step of selecting the word sequence having the highest appearance probability, by screening all the word sequences assigned appearance probabilities, according to which the word sequences are originally represented by the phoneme sequences, wherein, at the renewal step, the renewal value is calculated using a first language model which is employed when each of the word sequences always includes a specific symbol as a word and a second language model which is employed in other situations to renew the appearance probabilities based on the renewal value.

In another respect of the instant invention, there is provided is a recording medium for storing a program that controls a computer to perform: a transformation step of transforming sequences of phonemes extracted from an utterance into one or more word sequences, and of assigning to the word sequences appearance probabilities, in accordance with which the word sequences are originally represented by the phoneme sequences, a renewing step of renewing the appearance probability assigned to each of the word sequences by employing a renewal value represented by a language model corresponding to each of the word sequences; and a speech recognition step of selecting the word sequence having the highest appearance probability, by screening all the word sequences assigned appearance probabilities, according to which the word sequences are originally represented by the phoneme sequences, wherein, at the renewal step, the renewal value is calculated using a first language model which is employed when each of the word sequences always includes a specific symbol as a word and a second language model which is employed in other situations to renew the appearance probabilities based on the renewal value.

For a better understanding of the present invention, together with other and further features and advantages thereof, reference is made to the following description, taken in conjunction with the accompanying drawings, and the scope of the invention that will be pointed out in the appended claims.

DETAILED DESCRIPTION OF THE PREFERRED EMBODIMENT

A currently employed dictation system in most cases employs a special task called a Topic. A Topic is formed by using a pronunciation dictionary for computer terms and an estimated language model that is prepared by using a large volume of corpora, for which the dictionary is employed. When the Topic is used with a general-purpose model, it can be employed for dictation for a special operation.

According to the punctuation insertion method of the present invention, first, a dictionary in which an unvoiced tone is allocated for a punctuation mark is prepared and is added to a Baseform Pool. It should be noted that the automatic punctuation insertion function can be implemented, without using a language model, merely by employing a conventional general-purpose language model and by introducing a Topic which includes only a pronunciation dictionary. However, since a general-purpose language model does not provide for a punctuation mark for use when making an estimate for the N-gram model, the precision of such an estimate is reduced.

However, according to the punctuation insertion method of the present invention, a special language model for predicting a punctuation mark is prepared for the automatic punctuation insertion Topic, and a large amount of corpora is examined. By using the punctuation insertion method of this invention, only words (several thousand) that frequently appear before and after a punctuation mark are employed as elements of the language model, and the N-gram language model, to include the punctuation marks, is estimated equation 1 is used to linearly interpolate it with the general-purpose language model. As a result, the reliability of a prediction concerning a punctuation mark is enhanced. This process will be described while referring to FIGS. 5 and 6

$$Pr(w1|w2,w3)=\lambda 1(w1|w2,w3)+(1-\lambda)P2(w1|w2, w3) \quad (1)$$

wherein N=3; 0<8 1; P1 denotes a general-purpose language model; and P2 denotes a punctuation Topic language model.

Figure 1:
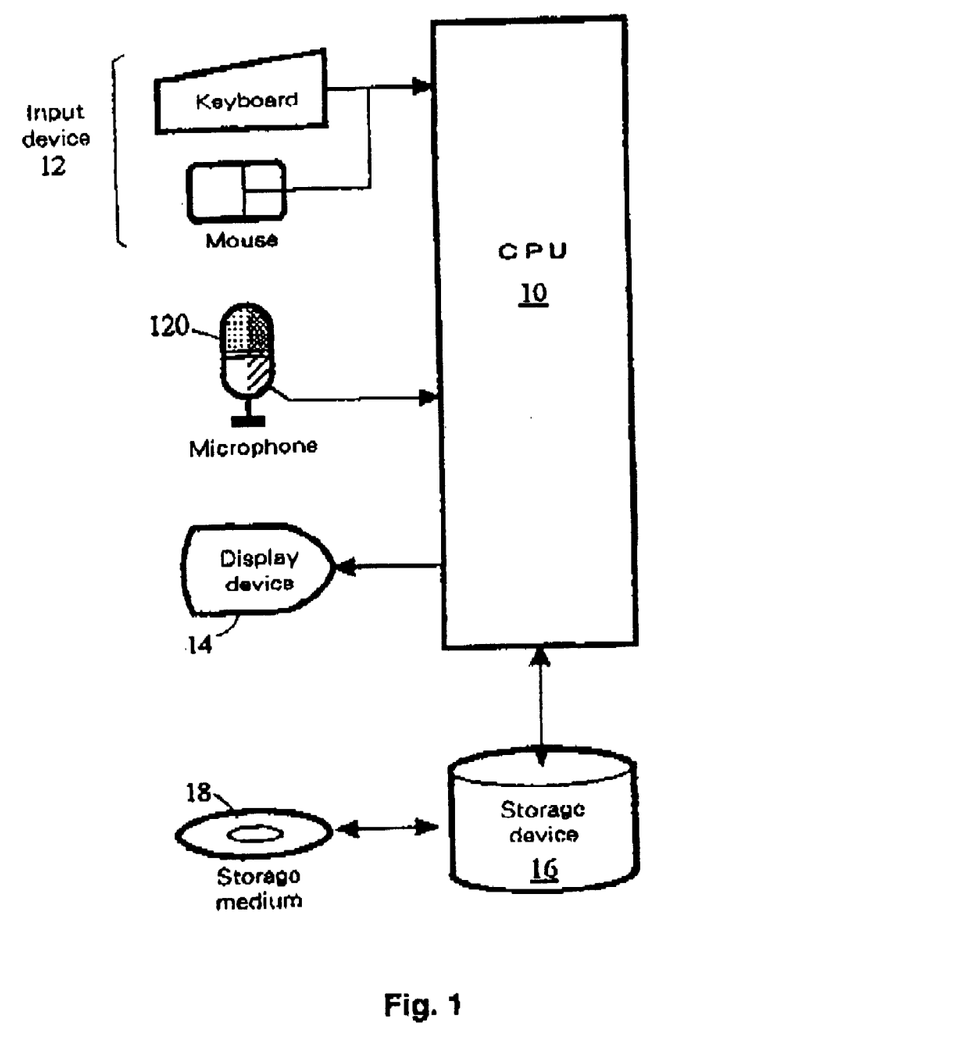
FIG. 1 is a diagram showing the arrangement of the speech recognition apparatus 1 of the present invention.

A speech recognition apparatus according to the present invention will now be described in further detail with reference to FIG. 1 Speech recognition apparatus 1 comprises: a CPU 10, which includes a micro processor, a memory and their peripheral circuits (none of which are shown); an input device 12, with includes devices such as a mouse and a keyboard; a microphone 120, which is a voice input device; a display device 14, such as a CRT; and a storage device 16, such as an HDD, a DVD drive or a CD drive.

Specifically, the speech recognition apparatus 1 employs the same hardware arrangement that is commonly used for a computer, plus an added voice input device 120. The speech recognition apparatus 1 executes a speech recognition program 2 (which will be described later while referring to FIG. 2) that has been written to a storage medium 18, such as a DVD, a CD-ROM or a CD-RAM; identifies the digital voice data into which utterances input via the voice input device 120 are transformed; generates text data into which punctuation marks (",", and ".") are automatically inserted; and records the text data on the storage medium 18 that is loaded into the storage device 16, or displays it on the display device 14.

Figure 2:
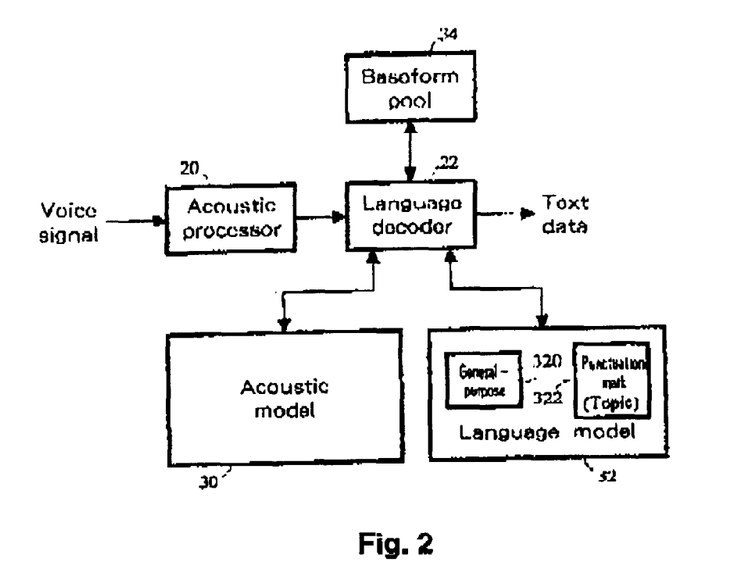
FIG. 2 is a diagram showing the configuration of the speech recognition program 2 that carries out the speech recognition method of the present invention.

Referring now to FIG. 2, the configuration of the speech recognition program 2 that carries out the speech recognition method of the present invention is shown. The speech recognition program 2 is constituted by an acoustic processor 20, a language decoder 22, an acoustic model 30, a language model 32 and a baseform pool 34, as described above. The language model 32 includes a general-purpose language model 320 and a punctuation mark language model 322.

The acoustic processor 20 performs a frequency analyzation process, such as a Fourier transformation, and the characteristic extraction process for extracting voice data from utterances that are entered via the voice input device 120 (FIG. 1), transforms the voice data into a feature vector, and outputs the vector to the language decoder 22.

The acoustic model 30 outputs, to the language decoder 22, acoustic model data obtained by writing, in the HMM (Hidden Markov Model), the appearance probability (a numerical value is great as a probability is high in accordance with which the word sequences are originally represented by the phoneme sequences) assigned to a feature vector for each phoneme.

The baseform pool 34 includes a general-purpose section that corresponds to the general-purpose language model 320 in the language model 32, and a punctuation section that corresponds to the punctuation mark language model 322 and that detects a blank portion (a pause, or a portion that corresponds to a punctuation mark, a ",", or a ".") in the acoustic model data. While these two sections are not shown in FIG. 2, they will be described later while referring to FIGS. 5 and 6. The baseform pool 34 defines the acoustic model data prepared by the acoustic model 30 as a combination of N continuous words (e.g., N=3), and represents these data using a table format that corresponds to the appearance probability.

When the language decoder 22 performs the automatic punctuation insertion process, the baseform pool 34 regards a vocal pause as a word. When the language decoder 22 does not perform the automatic punctuation insertion process, the baseform pool 34 does not regard a pause as a word.

While the appearance probability of a general word or word sequence that is required for speech recognition is defined as the appearance probability assigned to a combination of N-continuous words (e.g., N=3), and the general-purpose language model 320 in the language model 32 is represented using a table format in association with the appearance probability. In general, the size of the general-purpose language model 320 is approximately 60 MB.

When N=3, the appearance probability of a combination of words is defined as an appearance probability that following the two preceding words another word will appear, and in the general-purpose language model 320, a punctuation mark is not regarded as a word.

The punctuation mark language model 322 is a specialized Topic for the insertion of punctuation marks. As with the general-purpose language model 320, while the appearance probability for a general word or a word sequence that is required for the insertion of punctuation is defined as the appearance probability for an N-contiguous (e.g., N=3) combination of words, and the punctuation for the language model 322 is represented by using a table format in association with such an appearance probability.

The punctuation mark language model 322 which has a smaller data volume, can be considered to be a specialized general-purpose language model 320 that regards a punctuation mark as a word and that automatically inserts a punctuation mark in a portion identified as a pause by the baseform pool 34.

The punctuation mark language model 322 includes words that are selected based on information that is mutually used with a punctuation class, i.e., words that are positioned as is shown in Table 1, for example, immediately before a punctuation mark.

Since the punctuation mark language model 322 limits its contents to information that is required for the insertion of punctuation marks, generally the volume of the storage area it requires for data can be reduced until it is 1/100th or 1/1000th the size of the area provided for the general-purpose language model 320.

The following table sets forth the upper 30 words included in the punctuation mark language model:

| Hm | Word |
|---|---|
| 275.111 | iru |
| 197.166– | da |
| 160.223 | shita |
| 159.425 | desu |
| 152.889 | wa |
| 137.400 | shi |
| 137.164 | ne |
| 129.855 | de |
| 112.604 | aru |
| 103.377 | ga |
| 79.751 | masu |
| 73.160 | ka |
| 66.952 | shikashi |
| 65.562 | ori |
| 63.930 | node |
| 63.078 | mashita |
| 62.469 | imasu |
| 59.100 | daga |
| 49.474 | nai |
| 48.714 | dewa |
| 47.663 | mata |
| 47.487 | ita |
| 45.156 | ari |
| 43.635 | atta |
| 40.711 | tame |
| 40.022 | shimasu |
| 39.564 | suru |
| 37.349 | datta |
| 33.754 | naku |
| 33.394 | ta |

It should be noted that Hm indicates the value of the information mutually used with the punctuation class.

Figure 3:
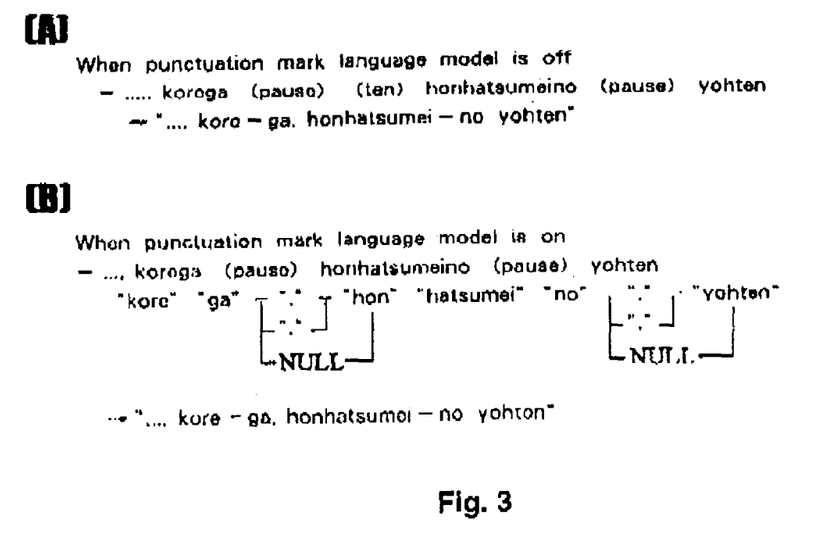
FIGS. 3A and 3B are diagrams showing the operation of the speech recognition program 2 (the language decoder 22) in FIG. 2.

Referring now to FIGS. 3A and 3B, these are diagrams showing the operation of the speech recognition program 2 (language decoder 22) in FIG. 2. In FIG. 3A, speech recognition is performed without using the punctuation mark language model 322 (OFF), and in FIG. 3B, speech recognition is performed using the punctuation mark language model 322 (ON).

The language decoder 22 outputs, to the display device 14 or the storage device 16, acoustic data that constitute a feature vector received from the acoustic processor 20, and text data that constitute a word sequence (W' in equation 2) for which the maximum probability is calculated by the baseform pool 34 and the language model 32. The acoustic data and the text data are displayed on the display device 14, or are recorded in the storage device 16.

As is shown in FIGS. 3A and 3B, depending on whether the punctuation mark language model 322 is employed, which will be described later while referring to FIGS. 4 to 6, the language decoder 22 automatically inserts punctuation marks.

In equation 2, P(S|W) is provided by the acoustic model 30 and the baseform model 34 and P(W) is provided by the language model 32. P(W) is obtained by using equation 1 to calculate a weighted average for the general-purpose language model 320 and the punctuation mark language model 322 in accordance with a value assigned to 8.

$$W' = \mathrm{argmax}_W P(W|S) = \mathrm{argmax}_W P(S|W)P(W) \qquad (2)$$

wherein S denotes a feature vector $(S_1, S_2, \ldots S_k)$; W denotes a word sequence $(W_1, W_2, \ldots W_1)$; and W' denotes a word sequence $(W'_1, W40_2, \ldots W'_1)$.

Figure 4:
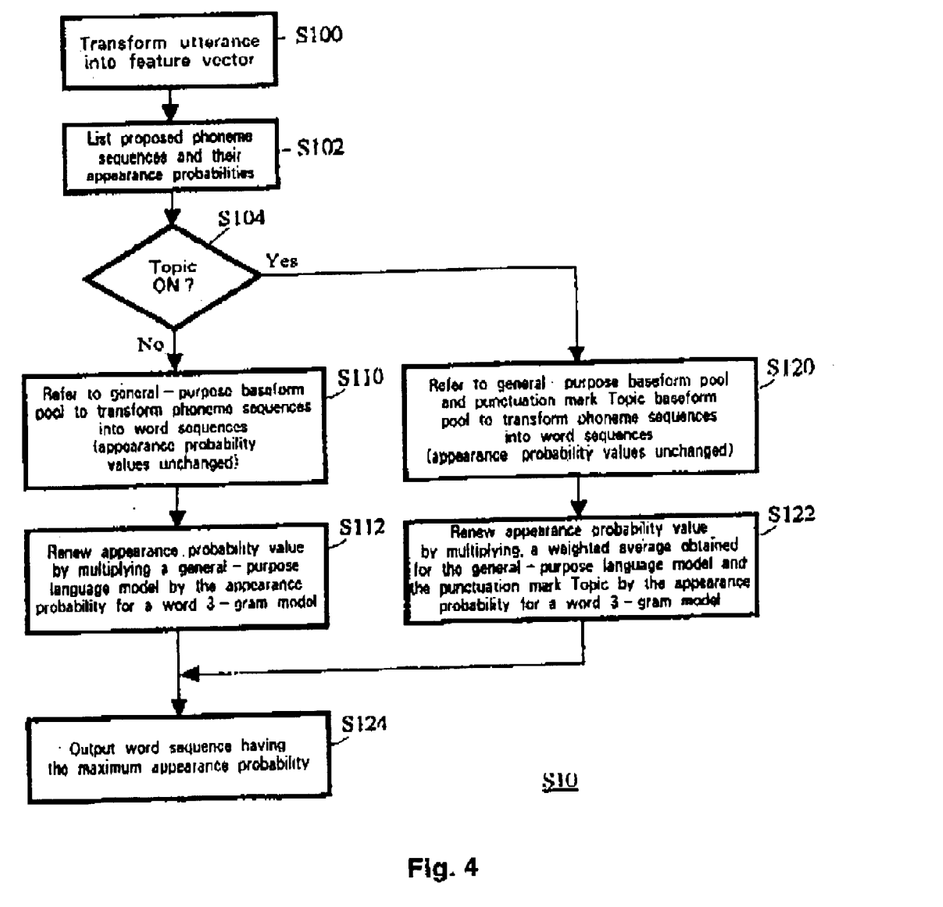
FIG. 4 is a flow chart showing the processing performed by the speech recognition apparatus 1 (the language decoder 22) in FIG. 2.
Figure 5:
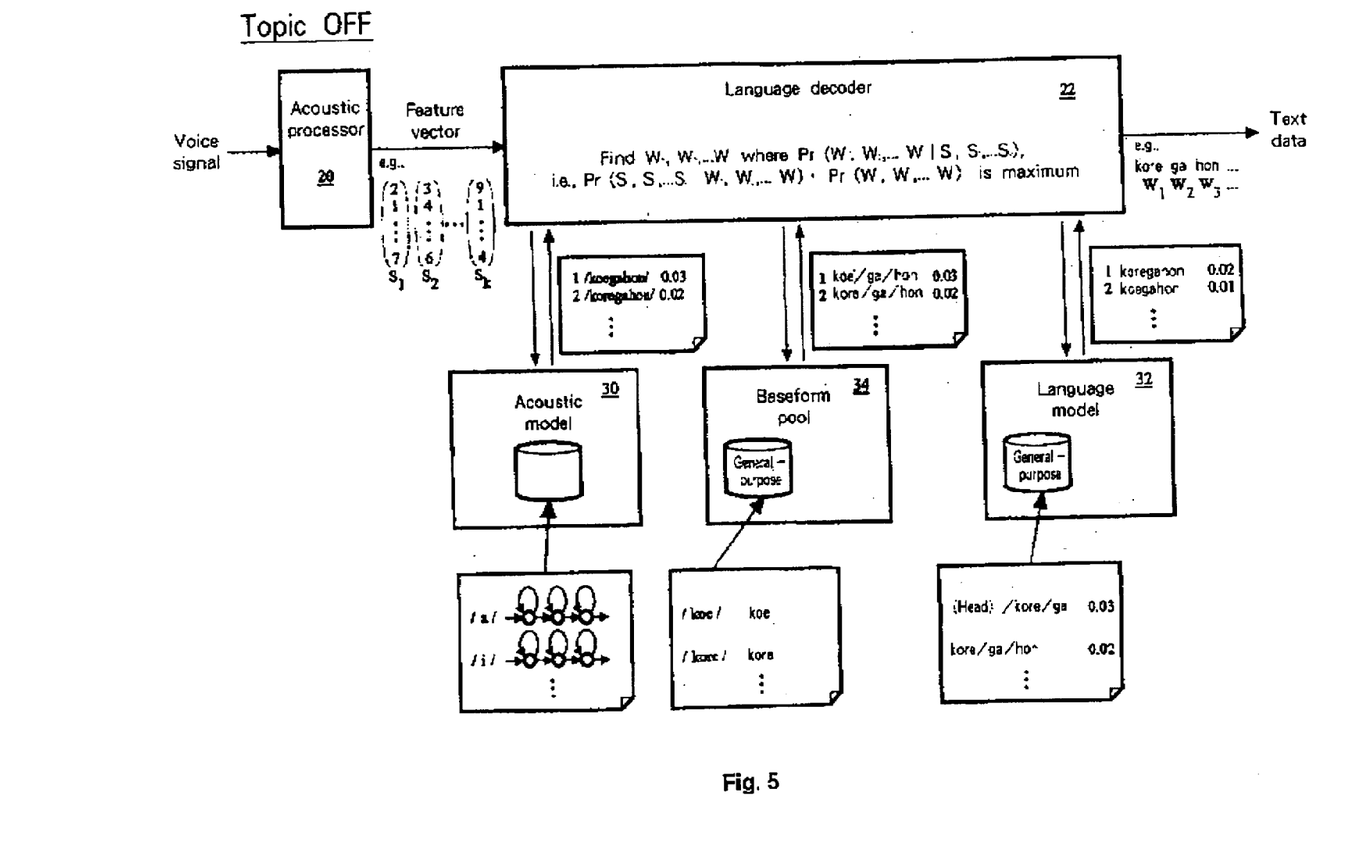
FIG. 5 is a diagram showing the operation of the speech recognition apparatus 1 (the language decoder 22) when the punctuation mark language model 322 in FIG. 2 is not employed and the automatic insertion of punctuation marks is not performed (Topic off).
Figure 6:
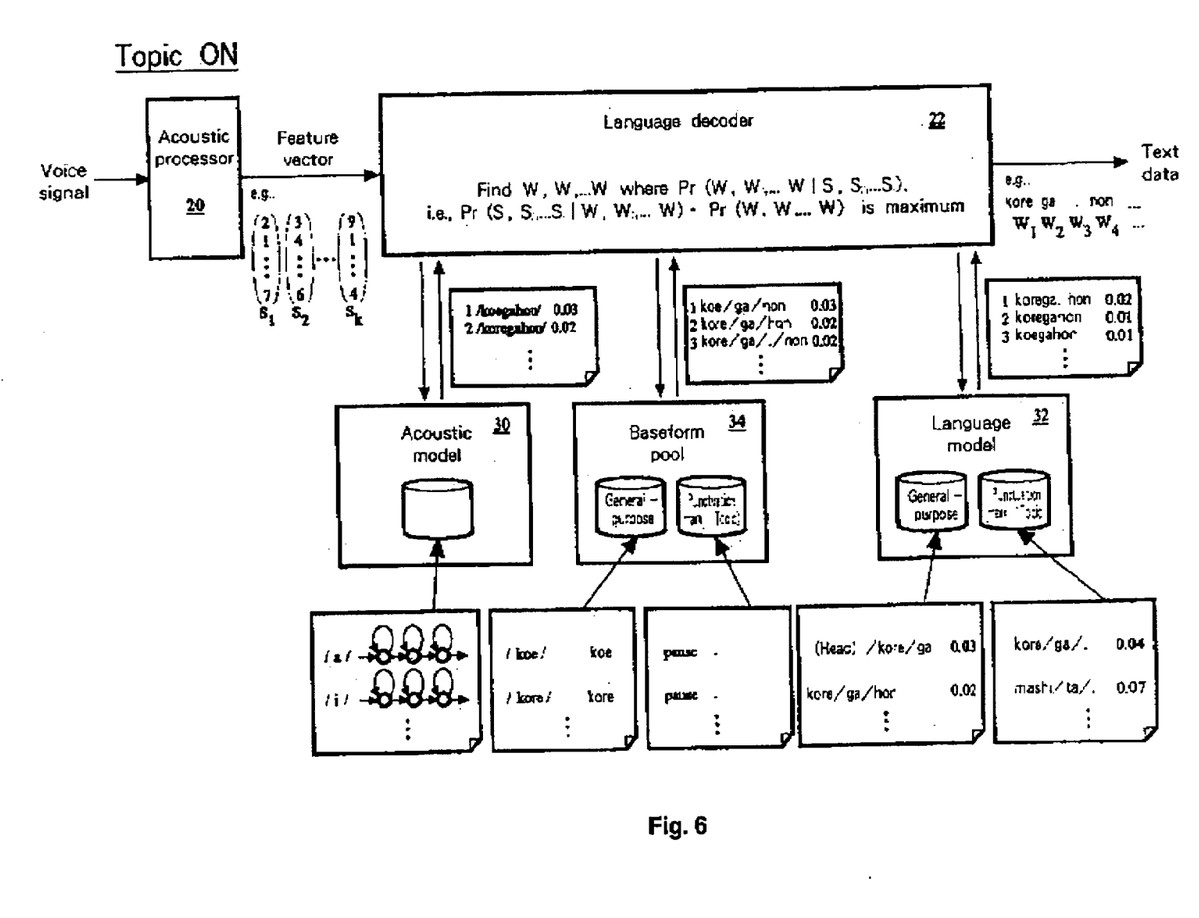
FIG. 6 is a diagram showing the operation of the speech apparatus a (the language decoder 22) when the punctuation mark language models 322 in FIG. 2 is employed and the automatic insertion of the punctuation marks is performed (Topic On).

Referring now to FIGS. 4 to 6 the operation of the language decoder 22 will be described in detail by using an example wherein a 3-gram model is employed as an N-gram model. FIG. 4 is a flowchart showing the processing performed by the speech recognition apparatus 1 (the language decoder. 22) in FIG. 2. FIG. 5 is a diagram showing the operation of the speech recognition apparatus 1 (the language decoder 22) when the punctuation mark language model 322 in FIG. 2 is not employed and the automatic insertion of punctuation marks is not performed (Topic off). FIG. 6 is a diagram showing the operation of the speech recognition apparatus 1 (the language decoder 22) when the punctuation mark language model 322 in FIG. 2 is employed and the automatic insertion of the punctuation marks is performed (Topic On).

As is shown in FIG. 4, at step 100 (S100), the acoustic processor 20 transforms an input utterance (e.g., "koregahon") into a feature vector, and outputs the vector to the language decoder 22.

At step S102 as is shown in FIGS. 5 and 6 the language decoder 22 outputs, to the acoustic model 30 the feature vector $(S_1, S_2, \ldots S_k)$. The acoustic model 30 generates acoustic data by providing an appearance probability (0.03 or 0.02) for a phoneme sequence ("/koegahon/" or "/koregahon/") that may (can) correspond to the feature vector, and transmits the acoustic data to the language decoder 22.

At step S104 the language decoder 22 determines whether a user has set the device for automatic punctuation insertion, i.e., whether the user has selected the punctuation mark language model 322 (Topic). If the device has not been set for automatic punctuation insertion (Topic is off), a value of "1" is assigned to 8, and program control advances to step S110. In the other case, a predetermined value ranging from 0 to 1 is assigned to 8, and program control moves to step S120.

When the automatic insertion of punctuation marks is not performed, at step S110, as is shown in FIG. 5, the language decoder 22 refers to only the general-purpose section (general-purpose baseform pool) in the baseform pool 34 and sequentially transforms the phoneme sequences ("/koegahon/," "/koregahon/," etc.) into word sequences ("koe/ga/hon," "kore/ga/hon," etc.), without regarding a pause as a word. It should be noted, however, that here the language decoder 22 does not change the appearance probability that is assigned to each word sequence.

At step S112, as is shown in FIG. 5, the language decoder 22 refers only to the general-purpose language model 320 to renew the appearance probability that is assigned to each word sequence at step S110. In FIG. 5, the language decoder 22 renews the appearance probability of 0.02 assigned to word sequence "/kore/ga/hon/," and the appearance probability of 0.01 assigned to word sequence "/koe/ga/hon/."

When the automatic insertion of punctuation marks is performed, at step S120 as is shown in FIG. 6, the language decoder 22 refers to both the general-purpose baseform pool and the punctuation section (Topic) to detect a pause in the baseform pool 34 and sequentially transforms the phoneme sequences ("/koegahon/," "/koregahon/," etc.) into word sequences ("/koe/ga/hon/," "/kore/ga/hon/," "/kore/ga/, /hon/," etc.), while regarding a pause as a word. It should be noted that here, as at step S110 the language decoder 22 does not change the value assigned to the appearance probability.

At step S122 as is shown in FIG. 5, the language decoder 22 weights the general-purpose language model 320 and the punctuation mark language model 322 in accordance with equation 1 by using 8 . . . 1. The language decoder 22 then refers to the resultant models to renew the appearance probability assigned to each word sequence obtained at step S110. In FIG. 5, the language decoder 22 renews the appearance probability of 0.02 assigned to word sequence "/kore/ga/, /hon/," and the appearance probability of 0.01 assigned to the other word sequences.

At step S24 as is shown in FIGS. 5 and 6 the language decoder 22 sequentially outputs, as text data that represent the speech recognition results, the word sequence that had the highest appearance probability when it was renewed at step S112 or S122.

The operation of the speech recognition apparatus 1 (FIG. 1 or 2 ) will now be described.

When the punctuation mark language model 322 (FIG. 2) is not employed ($\lambda=1$), as is shown in FIG. 3A a speaker employs the voice input device 120 (FIG. 1) of the speech recognition apparatus 1 to enter the utterances "korega"•"pause (indicates an unvoiced interval; used hereinafter)"•"ten"•"honhatsumeino"•"pause"•"yohten" (all written using katakana) In this case, the acoustic processor 20 processes the voice data, and outputs to the language decoder 22 a feature vector for which phonemes are used to represent the utterances.

As is shown in FIGS. 4 and 5 the language decoder 22 (FIG. 2) employs only the general-purpose language model 320 to process the feature vector received from the acoustic processor 20 Then, the language decoder 22 identifies "korega" (katakana) as "korega" (hiragana), the "ten" after "pause" as a comma, and "honhatsumeino" (katakana) as "honhatsumei-no" (kanji and hiragana). Subsequently, since neither "ten" nor "maru" follows the next "pause," the language decoder 22 identifies "yohten" (katakana) as "yohten" (kanji), and outputs, as the result of the identification process, the text data "kore-ga, honhatsumei-no yohten."

When the punctuation mark language model 322 (FIG. 2) is employed ($\lambda \neq 1$), and unlike the above case wherein the punctuation mark language model 322 is employed, a speaker employs the voice input device 120 (FIG. 1) of the speech recognition apparatus 1 to enter the utterances "korega"•"pause"•"honhatsumeino"•"pause"•"yohten" (all written using katakana), while omitting the utterance "ten," as is shown in FIG. 3B. The acoustic processor 20 (FIG. 2) processes the voice data, and outputs, to the language decoder 22 a feature vector for which phonemes are used to represent the utterances.

As is shown in FIGS. 4 and 6 the language decoder 22 employs both the general-purpose language model 320 and the punctuation mark language model 322 to process the feature vector received from the acoustic processor 20. Then, the language decoder 22 identifies "korega" (katakana) as "korega" (hiragana), "pause" after "ga" in "korega" as a comma, and "honhatsumeino" (katakana) as "honhatsumei-no" (kanji and hiragana). Since generally no punctuation mark follows "no," although in this instance "pause" follows "honhatsumeino," the language decoder 22 does not insert a punctuation mark at "pause," and identifies the input vice as "kore-ga, honhatsumei-no yohten," as precisely as when the punctuation mark language model 322 is not employed. The results of the identification process are output as text data.

The Topic model is formed using a pronunciation dictionary wherein an unvoiced sound is allocated for a punctuation mark, and for this a size is required (e.g., 2 MB) that is much smaller than that allocated for a conventional automatic punctuation insertion task.

According to the punctuation mark insertion method of the invention, since the Topic need only be added for the automatic insertion of punctuation marks, almost no alterations are required to add the automatic punctuation insertion function to a conventional, general-purpose dictation system.

Furthermore, a user can easily turn the automatic punctuation insertion function on or off merely by selecting the punctuation mark insertion Topic, and regardless of whether this function is turned on or off, the re-starting of the program is not required.

Further, while the number of punctuation marks used varies in accordance with the contents of sentences, according to the punctuation mark insertion method of this invention, the frequency at which punctuation marks appear can be easily controlled by adjusting the weight at the time the linear interpolation is performed with the general-purpose language model.

The punctuation mark insertion Topic can be used with a Topic specialized for another field, such as "computers," "soccer" or "baseball." Thus, the automatic insertion of punctuation marks can be performed at the same time as is the speech recognition for which the Topic for computers is used.

The punctuation mark insertion method of this invention can be applied for the automatic insertion of not only punctuation marks but also other symbols, such as a "?" mark.

In accordance with the speech recognition apparatus and method described above, both the general-purpose vocabulary/language model and the specialized vocabulary/language model can be employed to insert a symbol, such as a punctuation mark, into an appropriate position in a sentence.

All those certain preferred embodiments of this present invention have been described in detail with reference to the accompanying drawings, those skilled in the art should appreciate that the various changes and modifications may be made therein without departing from the spirit and scope of this invention.

What is claimed is:

1. A speech recognition apparatus comprising:
   a transformer for transforming sequences of phonemes extracted from an utterance into one or more word sequences, and for assigning to said word sequences appearance probabilities, in accordance with which said word sequences are originally represented by said phoneme sequences;
   a renewer for renewing said appearance probability assigned to each of said word sequences by employing a renewal value represented by a language model corresponding to each of said word sequences; and
   a speech recognizer for selecting the word sequence having the highest appearance probability, by screening all said word sequences assigned appearance probabilities, according to which said word sequences are originally represented by said phoneme sequences,
   wherein said renewer calculates said renewal value using a first language model which is employed when each of said word sequences always includes a specific symbol as a word and a second language model which is employed in other situations to renew said appearance probabilities based on said renewal value.

2. The speech recognition apparatus according to claim 1, wherein said first language model is demonstratively reliable, in that when each of said word sequences includes a specific symbol, such as a word, each of said word sequences was originally represented by one of said phoneme sequences; wherein said second language model is also demonstratively reliable, in that when other situations are encountered, each of said word sequences was originally represented by one of said phoneme sequences; wherein said renewer calculates said renewal value based on said first and said second language models, and employs said renewal value to renew said appearance probability assigned to each of said sequences, so as to reflect said reliability demonstrated by said word sequences having been represented originally by said phoneme sequences.

3. The speech recognition apparatus according to claim 2, wherein said first and said second language models are N-gram models; and wherein said renewer employs, as said renewal value, a weighted average calculated for said first and said second language models.

4. The speech recognition apparatus according to claim 2, wherein said symbol is a comma or a period.

5. The speech recognition apparatus according to claim 2, wherein, in order to include said symbol in the speech recognition results that are obtained, said phoneme sequence/word sequence transformer transforms said phoneme sequences into one or more word sequences, or in the other situation, transforms said phoneme sequences into one or more word sequences each of which includes words other than said symbol, and provides said appearance probability; and wherein, in order to include said symbol in the results obtained by the speech recognition process, said renewer employs said first and said second language models to renew said appearance probability assigned to each of said word sequences, or in the other situation, employs only said second language model to renew said appearance probability.

6. The speech recognition apparatus according to claim 5, wherein said first and said second language models are N-gram models; and wherein said renewer employs, as said renewal value, a weighted average calculated for said first and said second language models.

7. The speech recognition apparatus according to claim 5, wherein said symbol is a coma or a period.

8. The speech recognition apparatus according to claim 1, wherein said first language model is demonstratively reliable in that when each of said word sequences includes a specific symbol, analogous to a word, each of said word sequences includes one or more words in the order for each of said word sequences; wherein said second language model is demonstratively reliable in that in other situations the pertinent word sequence includes one or more words arranged in the same order as that of each of said word sequences; and wherein said renewer calculates said renewal value based on said first and said second language models, and employs said renewal value to renew said appearance probability assigned to each of said sequences, so as to demonstrate said reliability for each of said word sequences that was originally represented by said phoneme/sequences.

9. The speech recognition apparatus according to claim 8, wherein said first and said second language models are N-gram models; and wherein said renewer employs, as said renewal value, a weighted average calculated for said first and said second language models.

10. The speech recognition apparatus according to claim 8, wherein said symbol is a comma or a period.

11. The speech recognition apparatus according to claim 8, wherein, in order to include said symbol in the speech recognition results that are obtained, said phoneme sequence/word sequence transformer transforms said phoneme sequences into one or more word sequences, or in the other situation, transforms said phoneme sequences into one or more word sequences each of which includes words other than said symbol, and provides said appearance probability; and wherein, in order to include said symbol in the results obtained by the speech recognition process, said renewer employs said first and said second language models to renew said appearance probability assigned to each of said word sequences, or in the other situation, employs only said second language model to renew said appearance probability.

12. The speech recognition apparatus according to claim 11, wherein said symbol is a comma or a period.

13. The speech recognition apparatus according to claim 1, wherein said first and said second language models are N-gram models; and wherein said renewer employs, as said renewal value, a weighted average calculated for said first and said second language models.

14. The speech recognition apparatus according to claim 1, wherein said symbol is a comma or a period.

15. A method of speech recognition comprising the steps of:

transforming sequences of phonemes extracted from an utterance into one or more word sequences, and of assigning to said word sequences appearance probabilities, in accordance with which said word sequences are originally represented by said phoneme sequences;

renewing said appearance probability assigned to each of said word sequences by employing a renewal value represented by a language model corresponding to each of said word sequences; and selecting the word sequence having the highest appearance probability, by screening all said word sequences assigned appearance probabilities, according to which said word sequences are originally represented by said phoneme sequences, wherein, at during said renewing, said renewal value is calculated using a first language model which is employed when each of said word sequences always includes a specific symbol as a word and a second language model which is employed in other situations to renew said appearance probabilities based on said renewal value.

16. A program storage device readable by machine, tangibly embodying a program of instructions executable by the machine to perform method steps for providing symbol insertion, said method comprising the steps of:

transforming sequences of phonemes extracted from an utterance into one or more word sequences, and of assigning to said word sequences appearance probabilities, in accordance with which aid word sequences are originally represented by said phoneme sequences;

renewing said appearance probability assigned to each of said word sequences by employing a renewal value represented by a language model corresponding to each of said word sequences; and selecting the word sequence having the highest appearance probability, by screening all said word sequences assigned appearance probabilities, according to which said word sequences arm originally represented by said phoneme sequences, wherein, during said renewing, said renewal value is calculated using a first language model which is employed when each of said word sequences always includes a specific symbol as a word and a second language model which is employed to renew said appearance probabilities based on said renewal value.

* * * * *